(12) United States Patent
Palvoelgyi

(10) Patent No.: US 6,435,557 B1
(45) Date of Patent: Aug. 20, 2002

(54) FUEL TANK FOR AUTOMOBILE

(76) Inventor: Sandor Palvoelgyi, Frankenberg 151, A-8200, Gleisdorf (AT)

( * ) Notice: Subject to any disclaimer, the term of this patent is extended or adjusted under 35 U.S.C. 154(b) by 0 days.

(21) Appl. No.: 09/770,130

(22) Filed: Jan. 26, 2001

(30) Foreign Application Priority Data

Jan. 26, 2000 (AT) .......................................... 50/2000 U

(51) Int. Cl.[7] ................................................. B60P 3/22
(52) U.S. Cl. ...................... 280/834; 280/830; 220/4.14; 220/4.21; 220/677; 220/692
(58) Field of Search ................. 280/834, 830; 220/4.14, 4.17, 4.21, 4.24, 681, 677, 678, 692, 693; 277/637, 638, 639, 641, 642, 643

(56) References Cited

U.S. PATENT DOCUMENTS

| | | | |
|---|---|---|---|
| 2,439,306 A | * | 4/1948 | Laidley |
| 2,566,777 A | * | 9/1951 | Schmidt ..................... 220/81 |
| 3,661,046 A | * | 5/1972 | Waud et al. ................. 85/46 |
| 4,131,980 A | * | 1/1979 | Zinnbauer ................... 29/463 |
| 4,444,373 A | | 4/1984 | Hayashi |
| 4,469,340 A | * | 9/1984 | Condet ........................ 280/834 |
| 4,621,822 A | * | 11/1986 | Knochelmann et al. ..... 280/834 |
| 4,765,635 A | | 8/1988 | Okada |
| 5,405,167 A | * | 4/1995 | Lee ............................. 280/834 |
| 6,059,252 A | | 5/2000 | Emmann et al. |

FOREIGN PATENT DOCUMENTS

FR 2785576 5/2000

* cited by examiner

Primary Examiner—Daniel G. DePumpo

(57) ABSTRACT

A fluid tank assembly comprises a first tank half having an upper edge flange with an expanded section or ledge extending outwards. A second mating tank half similarly has a lower edge flange and extending ledge. Both ledges have apertures, with lower ledge aperture having a smaller diameter than the upper ledge aperture. The second aperture has a raised edge or lip, so that an annular groove is formed between the lip and the inner edge of the upper aperture when the surfaces of the mating flanges and ledges are in contact and the apertures are coaxial. The two flange and ledge surfaces are normally welded or otherwise secured together. A binding material is added to the annular groove to substantially fill its volume so that a sealing connection is created. This sealing connection near the bolt aperture overcomes the sealing problem that is normally present in this region, and therefore extends the service life of the tank.

11 Claims, 1 Drawing Sheet

FUEL TANK FOR AUTOMOBILE

BACKGROUND OF THE INVENTION

The invention relates to a fluid tank mounting assembly for a motor vehicle, and in particular to an improved assembly wherein the tank is directly and securely attached to the vehicle body without the need for intermediate brackets, while simultaneously ensuring an excellent seal between two halves of the tank.

A metal fluid tank for a motor vehicle, such as a fuel tank, is commonly comprised of two shells or halves that are joined together at a flange in a fluid-tight manner. The top half may be directly welded to the vehicle body at several sheet metal tabs. Unfortunately, this type of attachment has various disadvantages. For example, the sheet-metal tabs can bend or tear way, and their welded connection to the container is subject to corrosion.

A different approach is described in U.S. Pat. No. 4,444,373. In this disclosure, the flange has apertures for inserting screw bolts there through. Brackets or mounting members are attached to the floor panel of the vehicle, and are formed with through-apertures at positions aligned with the apertures of the flange, with nuts secured in alignment with the through-apertures. Bolts are subsequently threaded into the nuts, whereby the tank is fixedly mounted, in a suspended manner, onto the mounting members. This approach involves the welding of additional parts, namely the mounting members, which increases the manufacturing cost.

A simpler approach, involving the direct attachment of the tank flange to the vehicle body with a bolt, has been tried unsuccessfully. In practice, the seal between the two tank halves deteriorates over time at the aperture in the flange, in part due to the large distance from the edge seam to the apertures of the tank halves. In the case that the tank is a fuel tank, this sealing deterioration around the bolt aperture leads to undesirable fuel leakage or fuel vapor emissions, which is also unacceptable in light of more stringent government emission regulations.

An object of the present invention is to provide a fluid tank mounting assembly for a motor vehicle, which achieves direct attachment of the tank to the vehicle body while simultaneously ensuring an adequate seal between the two tank halves.

Other objects and advantages of the present invention will become apparent from the following detailed description of the invention when considered in conjunction with the accompanying drawings.

SUMMARY OF THE INVENTION

A fluid tank assembly comprises a first tank half having an upper edge flange with an expanded section or ledge extending outwards, with the ledge having an aperture. A second mating tank half similarly has a lower edge flange and extending ledge with an aperture that is smaller in diameter than the upper aperture. The extending ledge of the lower edge flange has a raised edge or lip surrounding the second aperture so as to form an annular groove between the lip and the inner edge of the upper aperture when the surfaces of the mating flanges and ledges are in contact and the apertures are coaxial. The two flange and ledge surfaces are normally welded or otherwise secured together. A sealing member is disposed in the annular groove so that a fluid seal is created between the flanges about the annular groove. This sealing connection overcomes a sealing problem in the bolt region that would otherwise typically be present in this region, and therefore extends the service life of the fluid tank.

Means of combining the joining of two tank halves with the attachment of the tank flange to the vehicle body frame can also be achieved by inserting a bolt through the flange apertures and into a corresponding aperture in the vehicle body. An elastic piece is placed between the edge flanges and the body of the vehicle, in order to protect the weld seam at the flange edges. The elastic piece may also serve as a vibration isolator.

DETAILED DESCRIPTION OF THE INVENTION

Figure 1:
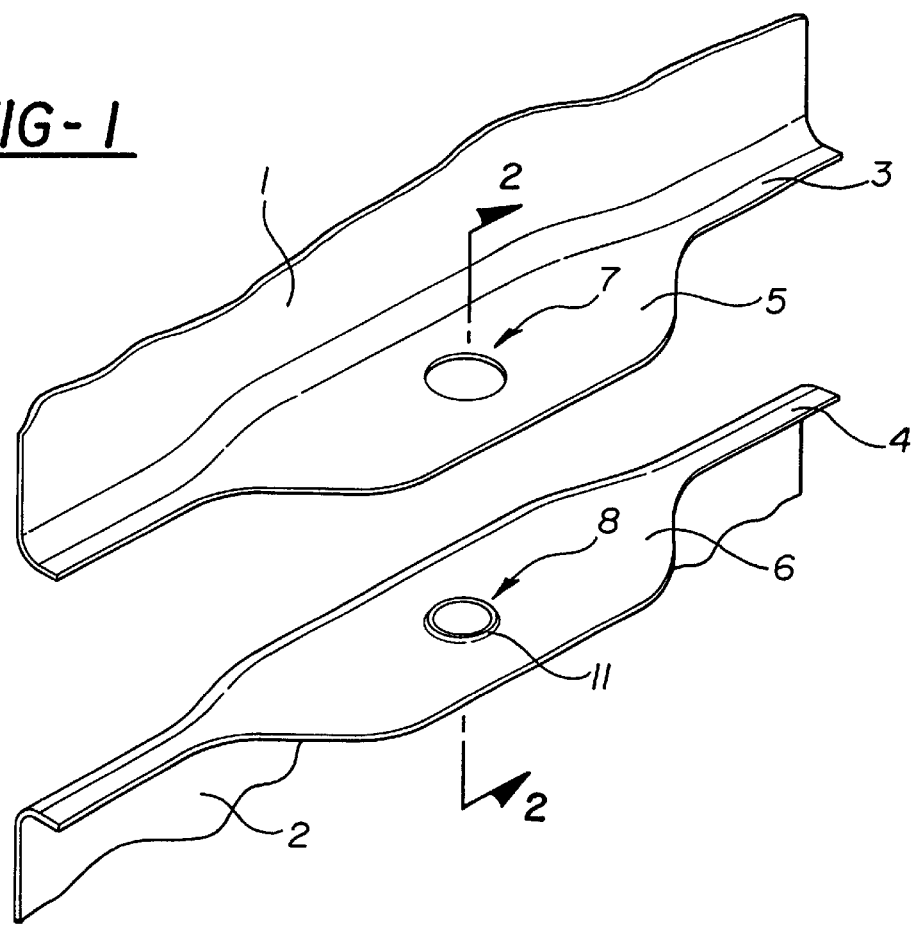
FIG. 1 is a perspective view of the flange edges of two fluid tank halves prior to their joining together.

FIG. 1 shows an exploded section of a fluid tank (not labeled), such as a fuel tank for a motor vehicle, comprising an upper tank half 1 and a lower tank half 2, which are respectively provided with upper and lower edge flanges 3 and 4. Upper and lower edge flanges 3, 4 each have an expanded section or ledge 5 and 6, respectively. The ledges 5, 6 together form an attachment surface for the two tank halves 1, 2.

The ledge 5 of the upper tank half 1 has an upper aperture 7, and similarly, the ledge 6 of the lower tank half 2 has a lower aperture 8. The diameter of the upper aperture 7 is greater than the diameter of the lower aperture 8. The ledge 6 of the lower flange 4 has a raised edge or lip 11 that surrounds the lower aperture 8. As further described below, the lip 11 is disposed in the upper aperture 7 when the tank halves 1, 2 are brought together in an assembled state.

Figure 2:
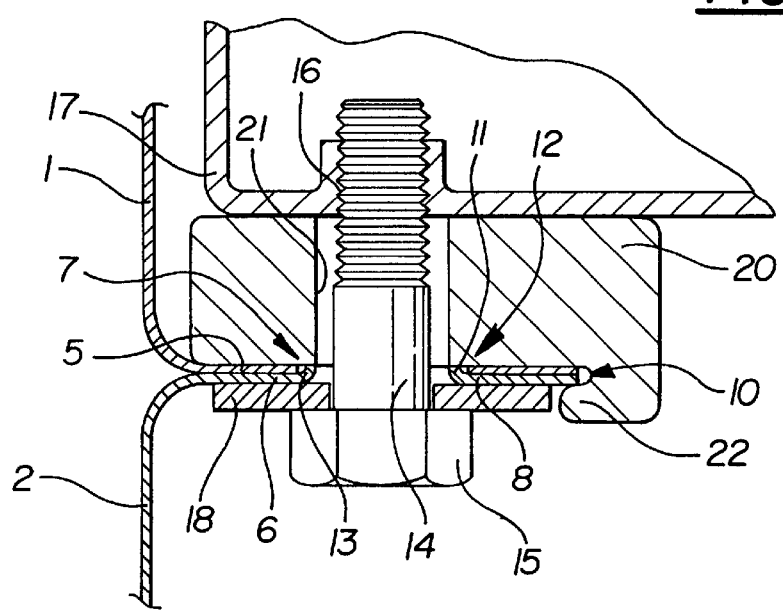
FIG. 2 is a cross-section view along II—II in FIG. 1, showing the two tank halves joined together.

FIG. 2 shows a cross-sectional view of the same part of the tank after assembly and mounting of the two tank halves. The two tank halves are brought into contact so that the edge flanges 3, 4 and their corresponding ledges 5, 6 are adjoining and the two apertures 7, 8 are coaxial. The edge flanges 3, 4 and their corresponding ledges 5, 6 are then secured together to form a circumferential edge seam 10. The seam 10 is preferably formed by welding or soldering the flanges 3, 4 together. Alternatively, the seam may be formed by bonding the flanges 3, 4 together by a suitable adhesive applied between the flanges 3, 4. When the tank halves 1, 2 are brought together, the lip 11 is disposed in the upper aperture such that an annular groove or gap 12 is formed between the lip 11 and the inner edge of the upper aperture 7. The cross-section of the annular groove 12 has the shape of a quarter circle as seen in cross-section (FIG. 2). It should be appreciated that while the apertures 7, 8 are shown as having a circular shape, they be of any suitable shape.

A sealing member 13, or filler material, is disposed in the annular groove 12 so that a fluid seal is created between the flanges 1, 2 about the annular groove, or gap, 12. The filler material 13 may underfill or overfill the annular groove 12 provided that an adequate seal about the groove is provided. Preferably, the sealing member 13, or filler material, is in the form of a binding material such as weld stock, solder, or a suitable adhesive. Alternatively, the sealing member 13, or filler material, may be a resilient O-ring seal or the like, which is sandwiched between the lip 11 and the inner edge of the upper aperture 7 or otherwise suitably held in place in a sealing condition.

The tank is mounted to the vehicle body 17 preferably by a threaded connecting bolt 14 that has a head 15 in which the tank rests. The bolt 14 is screwed into a threaded aperture 16 in a part 17 of the body of the vehicle. Alternatively, a nut (not shown) may replace the threaded aperture 16. Also, a rivet or other suitable type fastener may replace the bolt 14. Preferably, the bolt 14 or suitable fastener passes through a bearing washer 18 located on the exposed side of the lower flange 4 for uniformly distributing the stress that occurs when the bolt 14 is tightly clamped.

A spacer 20 is provided between the ledge 5 of the upper edge flange 3 and the vehicle body part 17. The spacer 20 has an inner aperture 21 through which the bolt 14 passes. The spacer 20 is designed to cover the filler material in the annular groove 12 and protect it from damage. For example, if the annular groove 12 is otherwise left unprotected, salt spray or other corrosive materials encountered during normal driving may cause corrosion damage to the seal formed by the filler material in the annular groove 20. Preferable, the spacer 20 is formed of a resilient material so that the spacer 20 will conform to the shape of the filler material. It should also be appreciated that the spacer 20 may act as a cap for sealably retaining an O-ring seal used as the filler material. The material and thickness of the spacer 20 can be adjusted to structural and mechanical requirements. The spacer 20 may also serve to dampen vibrations encountered during driving on rough terrain. If employed as a dampener, the spacer 20 should preferably have portions passing through the flanges 3, 4 and the vehicle part 17 in order to better isolate the tank from the vehicle.

In another embodiment, the elastic piece 20 has a hook 22 that extends over the edge seam 10, to protect the seam 10 from damage. The hook 22 also permits the elastic piece to be placed on and retained to the tank before mounting the tank to the vehicle.

I claim:

1. A fluid tank assembly comprising:

a first tank half having a first edge flange, said first flange having a first aperture;

a second tank half having a second edge flange, said second flange having a second aperture, said second aperture being smaller than said first aperture, said flanges adjoining each other with said apertures being aligned, said second flange having a lip surrounding said second aperture and disposed in said first aperture so as to form a gap between said lip and said first flange; and a sealing member disposed in said gap for providing a fluid seal between said flanges about said gap.

2. A fluid tank assembly according to claim 1, wherein said sealing member is welding stock.

3. A fluid tank assembly according to claim 1, wherein said sealing member is solder.

4. A fluid tank assembly according to claim 1, wherein said sealing member is an O-ring seal.

5. A fluid tank assembly according to claim 1 including a seam surrounding a perimeter defined by said flanges for providing a fluid seal between said flanges about said perimeter.

6. A fluid tank assembly according to claim 5 including a spacer covering said seam.

7. A fluid tank assembly for a motor vehicle, comprising:

a vehicle body frame having a frame aperture;

a fluid tank including a first tank half and an adjoining second tank half, said first tank half having a first edge flange, said first flange having a first flange aperture, said second tank half having a second edge flange, said second flange having a second flange aperture, said second aperture being smaller than said first aperture, said flanges adjoining each other with said apertures being aligned, said second flange having a lip surrounding said second aperture and disposed in said first aperture so as to form a gap between said lip and said first flange;

a sealing member disposed in said gap for providing a fluid seal between said flanges about said gap; and a connecting bolt that passes through each said aperture for connecting said tank flanges to said vehicle body frame.

8. A fluid tank assembly according to claim 7, wherein said sealing member is welding stock.

9. A fluid tank assembly according to claim 7, wherein said sealing member is solder.

10. A fluid tank assembly according to claim 7, wherein said sealing member is an O-ring seal.

11. A fluid tank assembly according to claim 7 including a seam surrounding a perimeter defined by said flanges for providing a fluid seal between said flanges about said perimeter.

* * * * *